(12) United States Patent
Chen

(10) Patent No.: US 7,114,728 B2
(45) Date of Patent: Oct. 3, 2006

(54) RAPID DETACHED CONNECTING DEVICE

(76) Inventor: Chang-Ying Chen, 235 Chung-Ho Box 8-24, Taipei (TW)

( * ) Notice: Subject to any disclaimer, the term of this patent is extended or adjusted under 35 U.S.C. 154(b) by 61 days.

(21) Appl. No.: 10/902,413

(22) Filed: Jul. 30, 2004

(65) Prior Publication Data

US 2006/0022416 A1    Feb. 2, 2006

(51) Int. Cl.
*B23B 31/107*    (2006.01)
(52) U.S. Cl. .............. 279/24; 279/29; 279/76; 279/80; 279/155; 279/156
(58) Field of Classification Search ............... 279/23.1, 279/24, 29, 76, 79, 80, 155, 156, 904, 22, 279/75, 82
See application file for complete search history.

(56) References Cited

U.S. PATENT DOCUMENTS

| | | | | |
|---|---|---|---|---|
| 2,751,229 A | * | 6/1956 | Schultz | 279/75 |
| 3,909,062 A | * | 9/1975 | Benatti | 279/47 |
| 4,052,788 A | * | 10/1977 | Hastings et al. | 29/764 |
| 4,787,278 A | * | 11/1988 | Bononi | 81/438 |
| 5,062,749 A | * | 11/1991 | Sheets | 279/75 |
| 5,211,701 A | * | 5/1993 | Csabafy | 408/239 R |
| 6,145,851 A | * | 11/2000 | Heber | 279/143 |
| 6,457,916 B1 | * | 10/2002 | Wienhold | 408/240 |
| 6,554,292 B1 | * | 4/2003 | Rohm | 279/137 |
| 6,637,755 B1 | * | 10/2003 | Chen et al. | 279/22 |
| 6,648,563 B1 | * | 11/2003 | Rohm | 408/239 R |
| 6,666,114 B1 | * | 12/2003 | Lin | 81/438 |
| 6,726,222 B1 | * | 4/2004 | Rohm et al. | 279/71 |
| 6,840,143 B1 | * | 1/2005 | Lin | 81/438 |
| 6,851,678 B1 | * | 2/2005 | Mack | 279/62 |

* cited by examiner

*Primary Examiner*—Monica Carter
*Assistant Examiner*—Michael W. Talbot

(57) ABSTRACT

A rapid detached connecting device comprises a rod body having an engaging portion; the rod body having a hollow body; an engaging block installed within the rod body; the engaging block having a stop block; a buckling unit inserted into the engaging portion for limiting the movement of the engaging block; an elastomer resisting against the engaging block so as to move toward a front end of the engaging portion; and an opener head having an guide tapered end and an annular groove; the guide tapered end having a shape corresponding to the stop block of the engaging block. When the opener head is inserted into the engaging portion of the rod body; a distal end of the opener head will press the engaging block so that the engaging block moves; and the stop block capable to adhere to the guide tapered end.

1 Claim, 7 Drawing Sheets

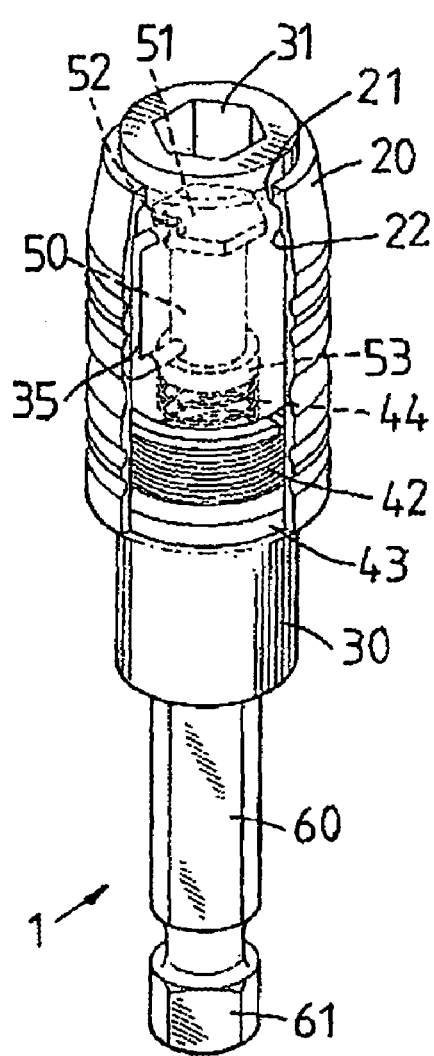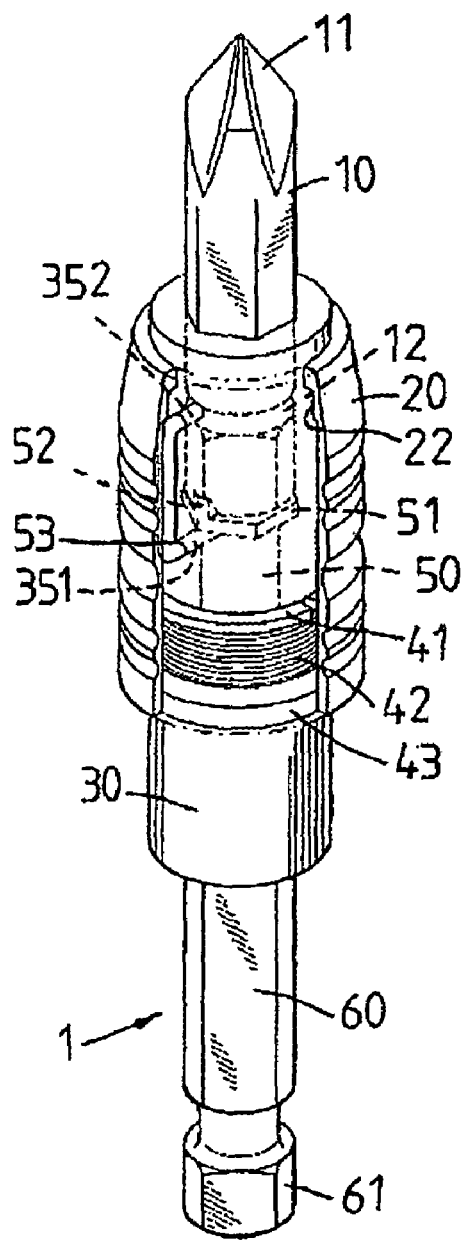
FIG. 3
FIG. 4

US 7,114,728 B2

RAPID DETACHED CONNECTING DEVICE

FIELD OF THE INVENTION

The present invention relates to connecting devices; and particular to a rapid detached connecting device which can be connected to an opener head quickly.

BACKGROUND OF THE INVENTION

Referring to FIGS. 11 and 12, a prior art rapid detached connecting device and an opener head are illustrated. A front end of the rapid detached connecting device has an engaging portion. An engaging block 91 is installed within the engaging portion. A spring is installed after the engaging block 91. A buckling unit 92 is installed within the engaging portion. The buckling unit 92 resists against the engaging block 91. When the engaging block 91 is pushed inwards, the buckling unit 92 will insert into the engaging portion. A front end of the opener head has a driving end corresponding to various screws. A middle section of the opener head has an annular groove and the rear end of the opener head has a guide tapered end 93 with a smaller diameter. Thereby, the user can insert the opener head into the engaging portion of the rapid detached connecting device. When the guide tapered end 93 at the rear end of the opener head is inserted into the engaging portion, the opener head will press the engaging block 91. At the same time, the buckling unit 92 of the engaging portion will insert into the engaging portion and collapse into the guide tapered end 93 of the opener head (see FIG. 12). Therefore, it is difficult to insert the opener head and thus the buckling unit is difficult to be buckled to the annular groove of the opener head. Thereby, a trouble in use is induced.

SUMMARY OF THE INVENTION

Accordingly, the primary object of the present invention is to provide a rapid detached connecting device which comprises a rod body having an engaging portion; the rod body being a hollow body; an engaging block installed within the rod body; the engaging block having a stop block; a buckling unit inserted into the engaging portion for limiting the movement of the engaging block; an elastomer resisting against the engaging block so as to move toward a front end of the engaging portion; and an opener head having an guide tapered end and an annular groove; the guide tapered end having a shape corresponding to the stop block of the engaging block. When the opener head is inserted into the engaging portion of the rod body; a distal end of the opener head will press the engaging block so that the engaging block moves so that the buckling unit will insert into the annular groove so as to confine the opener head; and the stop block capable to adhere to the guide tapered end so as to prevent the buckling unit from collapsing into the guide tapered end of the opener head.

The various objects and advantages of the present invention will be more readily understood from the following detailed description when read in conjunction with the appended drawing.

BRIEF DESCRIPTION OF THE DRAWINGS

FIG. 3 is a perspective view of the engaging block of the present invention.

FIG. 4 is a perspective view showing the assembly of the engaging block with the opener head according to the present invention.

DETAILED DESCRIPTION OF THE INVENTION

In order that those skilled in the art can further understand the present invention, a description will be described in the following in details. However, these descriptions and the appended drawings are only used to cause those skilled in the art to understand the objects, features, and characteristics of the present invention, but not to be used to confine the scope and spirit of the present invention defined in the appended claims.

Figures 1, 2:
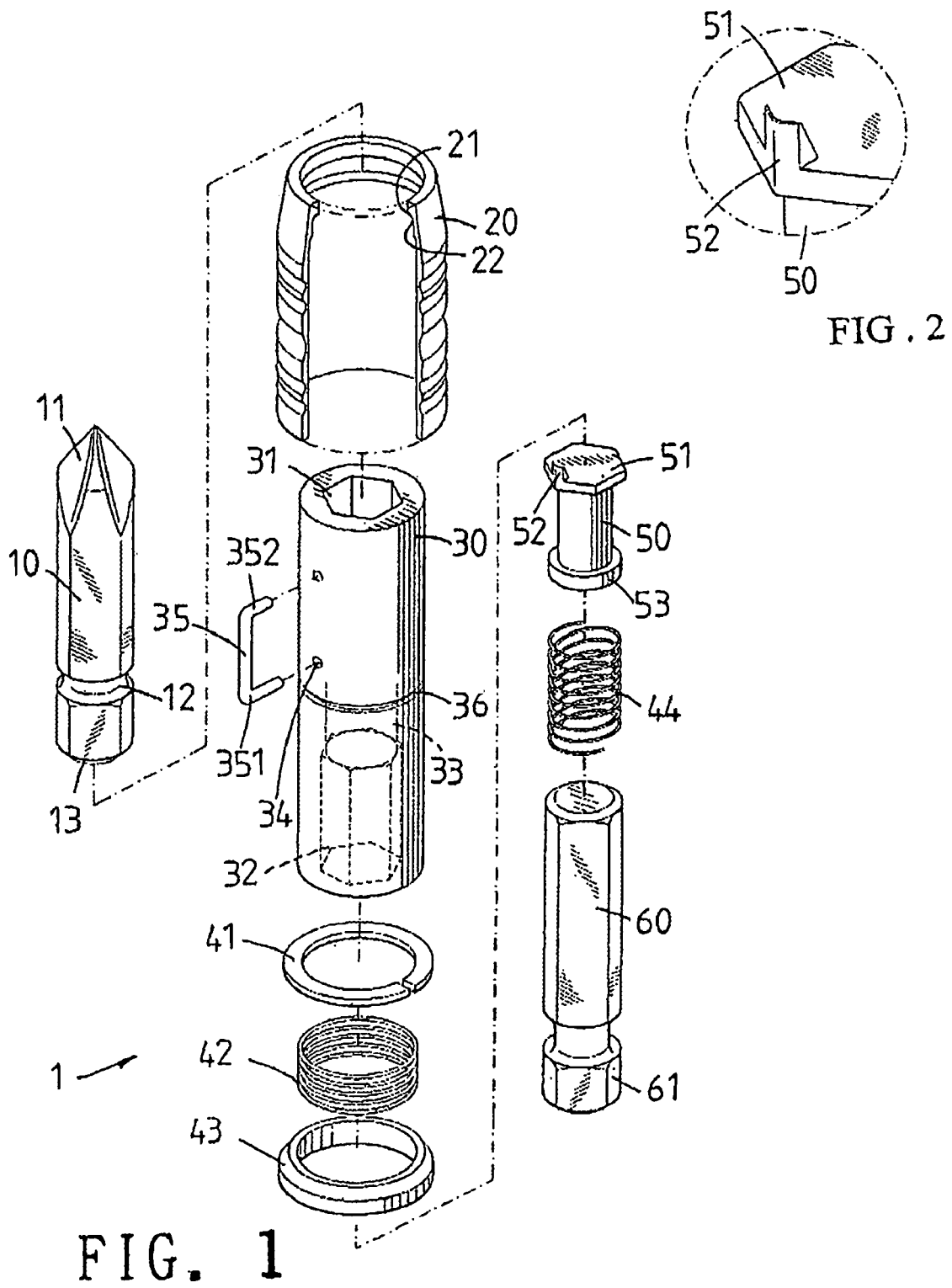
FIG. 1 is an exploded view of the engaging block of the present invention.
FIG. 2 is a partial enlarged view about the engaging block of the present invention.
Figure 5:
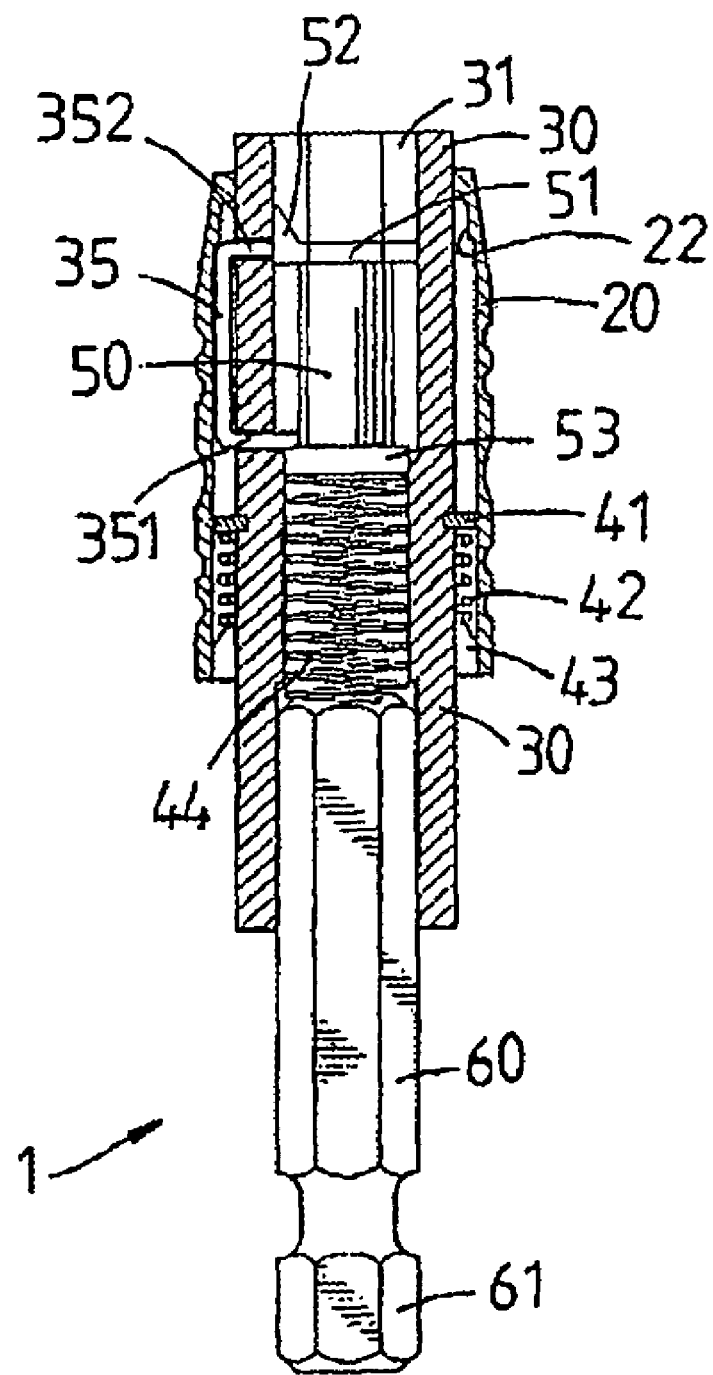
FIG. 5 is a cross section view about the engaging block of the present invention.
Figure 6:
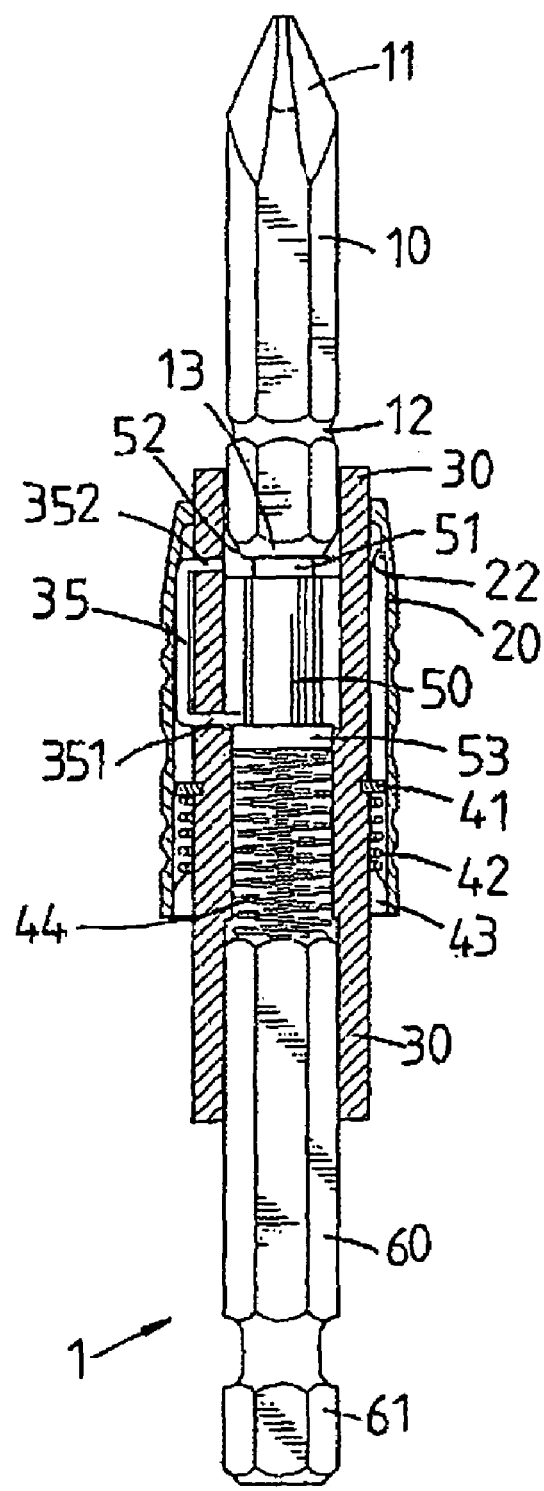
FIGS. 6, 7, and 8 are cross section views showing the assembly of the engaging block and the opener head the present invention.
Figure 7:
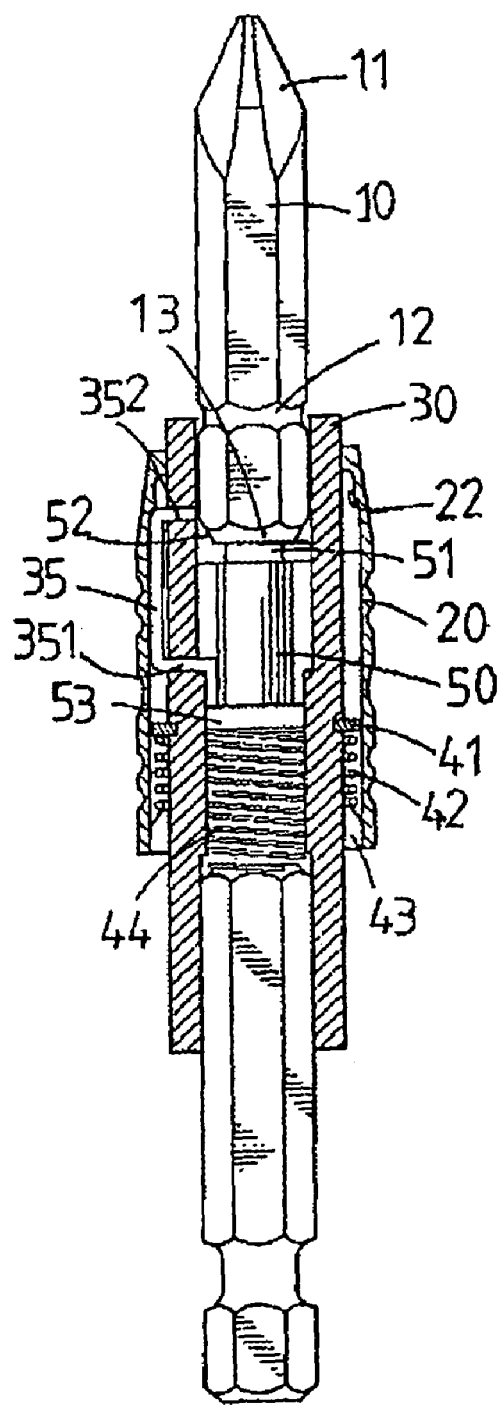
Figure 8:
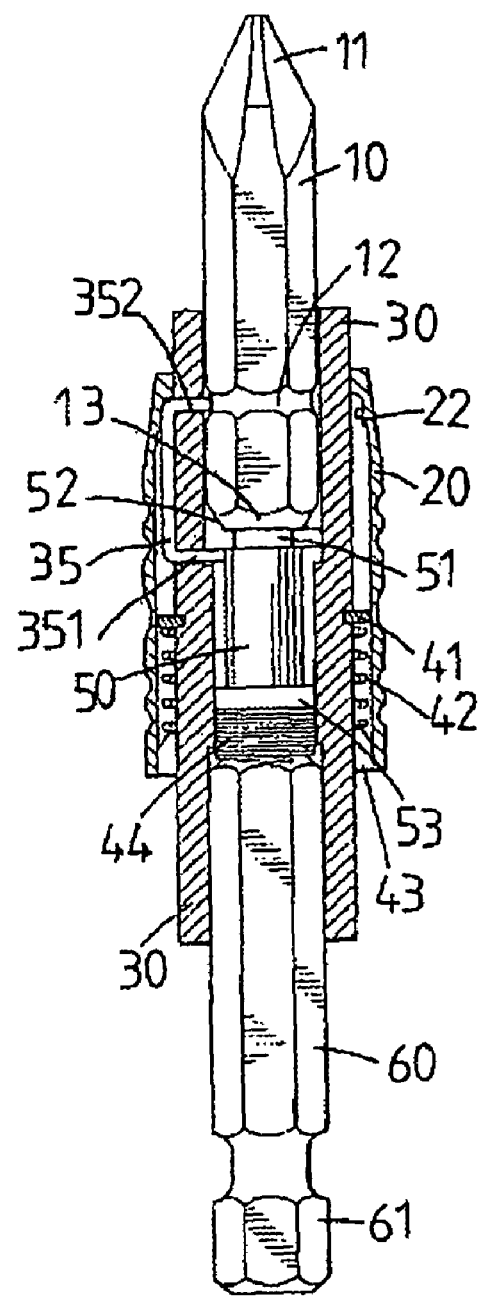

With reference to FIGS. 1 to 3, the present invention is illustrated. The present invention comprises the following elements.

An opener head 10 is included. A front end of the opener head 10 is a driving end 11 which can shaped to match various screws. A middle section of the opener head 10 has an annular groove 12 for buckling. A distal end of the opener head 10 is formed with an inward reduced guide tapered end 13.

A sleeve 20 is a hollow tube. An inner diameter of the sleeve 20 is slightly larger than an outer diameter of the rod body 30. A front end of the sleeve 20 has a stop edge 21. A resisting section 22 is formed with the stop edge 21.

An interior of a rod body 30 has a hexagonal engaging portion 31 and a rear end of the rod body 30 is formed with a hexagonal combining portion 32. A receiving chamber 33 is formed between engaging portion 31 and the combining portion 32. The opener head 10 can be inserted into the engaging portion 31. The engaging portion 31 has two holes 34 for insertion of a buckling unit 35. The buckling unit 35 has a long end 351 and a short end 352. A buckling recess 36 is formed below the two holes 34 for buckling a C ring 41.

A buckling ring 43 is elastic and the outer diameter of the buckling ring 43 is slightly larger than an inner diameter of the sleeve 20. An inner diameter of the buckling ring 43 is slightly larger than the outer diameter of the rod body 30. Thereby, the buckling ring 43 can be plugged into the interior of the sleeve 20 and is movable with the rod body 30.

An engaging block 50 is made of metal. A front end of the engaging block 50 is a hexagonal push surface 51. A stop block 52 is extended from one apex of the push surface 51. An inner side of the stop block 52 is inclined slightly so as to match the slope of the guide tapered end 13. A distal end of the engaging block 50 is formed with a limiting block 53.

A combining rod 60 has a shape corresponding to that of the combining portion 32 of the rod body 30. Thus the combining rod 60 can be tightly inserted into the rod body 30. A distal end of the combining rod 60 has a combining end 61 for combing with other object to be rotated.

In assembly of the present invention, a small elastomer 44 is placed into the receiving chamber 33 of the rod body 30. Then the combining rod 60 is inserted into the combining portion 32 so that the two are tightly engaged. The engaging block 50 is placed into the engaging portion 31 so that it is pushed by the small elastomer 44, and thus the two ends of the buckling unit 35 are inserted into the holes 34 of the rod body 30. The long end 351 of the buckling unit 35 is confined between the push surface 51 and the limiting block 53 so that the sliding path of the engaging block 50 is limited in a predetermined range. A C ring 41 is buckled to the buckling recess 36 of the rod body 30. Then a large elastomer 42 is placed into the rod body 30 from the rear end of the rod body 30 so that one end of the large elastomer 42 resists against the C ring 41. The sleeve 20 is placed into the rod body 30 from the front end of the rod body 30. The buckling ring 43 is placed against a lower edge of the sleeve 20 so that the buckling ring 43 resists against the large elastomer 42, as shown in FIG. 3. Thus the assembly of the engaging block 50 is completed.

With reference to FIGS. 4 to 8, in use of the present invention, the guide tapered end 13 at a rear end of the opener head 10 is inserted into the connecting device 1. When the user applies a force, the opener head 10 is pressed inwards. Since an inner side of the stop block 52 of the engaging block 50 resists against the guide tapered end 13 of the opener head 10, it can not be inserted into the engaging portion 31 to be buckled to the opener head 10. Thereby, the opener head 10 cannot be inserted thereinto easily. When the opener head 10 is inserted thereinto continuously, the engaging block 50 is pressed inwards, until the push surface 51 of the engaging block 50 is buckled by the long end 351 of the buckling unit 35 so as not to be moved inwards. The large elastomer 42 will resist against the buckling ring 43 so that the sleeve 20 of the buckling ring 43 is driven therewith. Thereby, when there is no force being applied to the sleeve 20, it will displace toward the lower end of the rod body 30 until the short end 352 of the buckling unit 35 is placed on the resisting section 22 of the sleeve 20 and is buckled to the stop edge 21 of the sleeve 20. Then, the buckling unit 35 is pressed by the resisting section 22 of the sleeve 20 so that the short end 352 of the buckling unit 35 will insert into the engaging portion 31 inwards to buckle the annular groove 12 of the opener head 10. As a result the opener head 10 is engaged into the engaging portion 31. Thereby, the assembly of the opener head 10 is completed.

When it is desired to detach the opener head 10, it is only necessary to move the sleeve 20 so that the buckling unit 35 move out of the resisting section of the sleeve 20 to generate a retract space. Thereby, the engaging block 50 will be resisted by the small elastomer 44 to push the opener head 10. Therefore, the short end 352 resisting against the buckling unit 35 of the annular groove 12 of the opener head 10 will be pushed out so as to take the opener head 10 easily.

Figure 9:
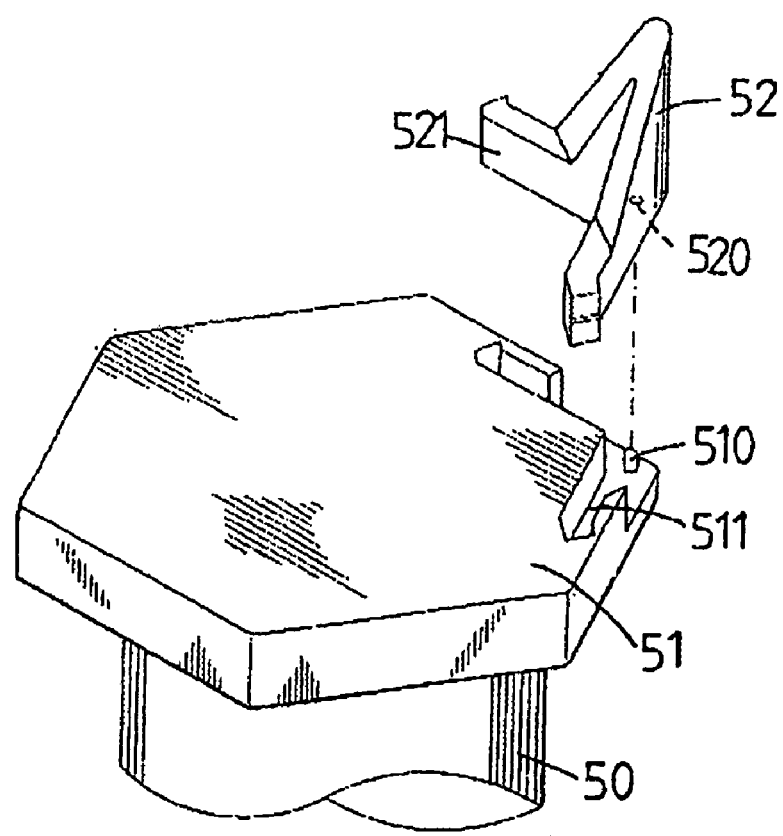
FIG. 9 is an exploded perspective view of the second embodiment of the engaging block of the present invention.
Figure 10:
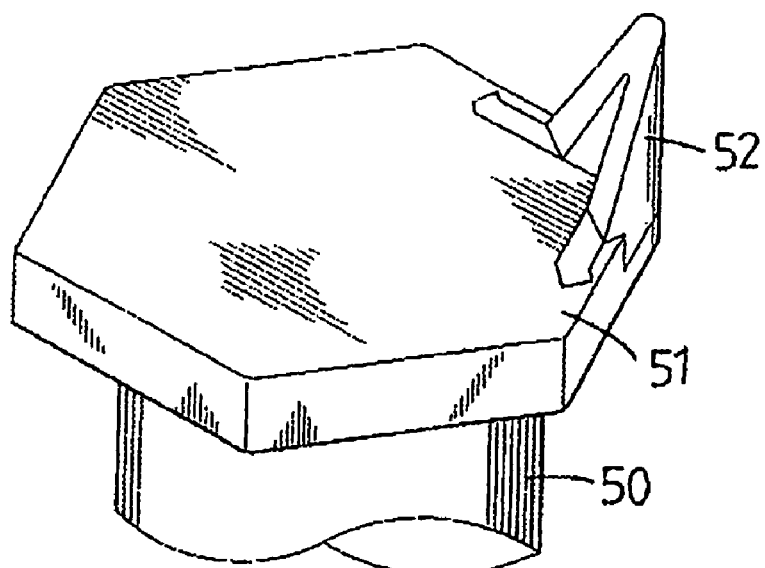
FIG. 10 is a partial perspective view about the second embodiment of the engaging block of the present invention.
Figure 11:
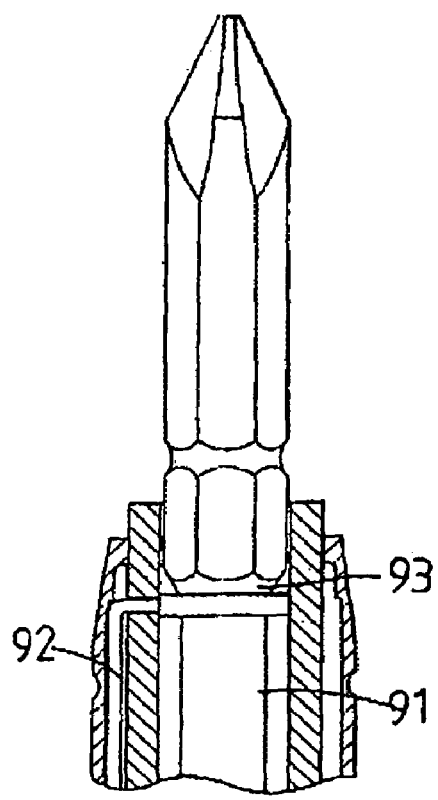
FIGS. 11 and 12 are assembly cross section view about the prior art connecting device.
Figure 12:
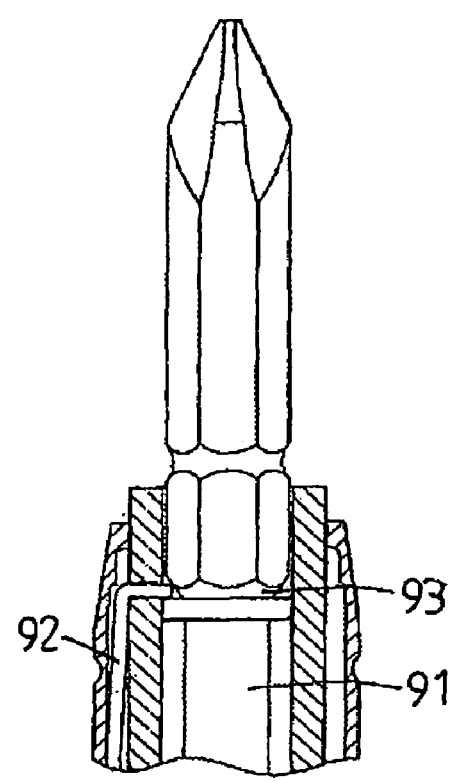

Referring to FIGS. 9 and 10, the second embodiment about the engaging block 50 of the present invention will be described herein. In the present invention, the parts same as the previous one is neglected. The difference of the two will be described hereinafter. In the present invention, the stop block 52 of the engaging block 50 is a separable one. When the stop block 52 is used for a long time so that the stop block 52 is worn, the stop block 52 can be detached to be replaced by a new one. A bottom of the stop block 52 has an insertion hole 520. Two opposite sides of the stop block 52 are extended with buckling strips 521. The engaging block 50 has a post 510 corresponding to the inserting hole 520 of the stop block 52 and two positioning grooves 511 corresponding to the buckling strips 521 of the stop block 52. Thereby, the stop block 52 can be inserted into the push surface 51 of the engaging block 50 so as to prevent the buckling unit 35 is collapsed into the guide tapered end 13 of the opener head 10 to be as a defect in operation.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A rapid detached connecting device comprising:

an opener head; a front end of the opener head being a driving end; a middle section of the opener head having an annular groove for buckling; a distal end of the opener head being formed with an inward reduced guide tapered end;

a sleeve being a hollow tube; a front end of the sleeve having a stop edge; a resisting section being formed with the stop edge;

a rod body; an interior of a rod body having a hexagonal engaging portion and a rear end of the rod body being formed with a hexagonal combining portion; a receiving chamber being formed between engaging portion and the combining portion; the opener head being inserted into the engaging portion; the engaging portion having two holes for insertion of a buckling unit; the buckling unit having a long end and a short end; a buckling recess being formed below the two holes for buckling a C ring;

a buckling ring being elastic and the outer diameter of the buckling ring being slightly larger than an inner diameter of the sleeve; the buckling ring being plugged into an interior of the sleeve and being movable with the rod body;

an engaging block being made of metal; a front end of the engaging block being a hexagonal push surface; a stop block being extended from one apex of the push surface; an inner side of the stop block being inclined slightly so as to match a slope of the guide tapered end; a distal end of the engaging block being formed with a limiting block; and a combining rod having a shape corresponding to that of the combining portion of the rod body; the combining rod being tightly inserted into the rod body; and a distal end of the combining rod having a combining end for combing with other object to be rotated.

* * * * *